United States Patent

Barnett

[11] Patent Number: 5,755,858
[45] Date of Patent: May 26, 1998

[54] SYNTHETIC TOPSOIL COMPOSITION

[75] Inventor: Jack Williams Barnett, Succasunna, N.J.

[73] Assignee: General Chemical Corporation, Parsippany, N.J.

[21] Appl. No.: 762,085

[22] Filed: Dec. 9, 1996

[51] Int. Cl.[6] ............... C05F 11/00
[52] U.S. Cl. .......... 71/9; 71/903; 71/904; 47/1.01 F
[58] Field of Search ............ 504/113, 280; 71/1, 9, 10, 11, 63, 903, 904; 47/1.01 F

[56] References Cited

U.S. PATENT DOCUMENTS 3,824,092  7/1974  Wikstrom et al. ............ 71/904
5,668,088  9/1997  Hamper et al. ............ 504/280

Primary Examiner—Ngoc-Yen Nguyen
Attorney, Agent, or Firm—Arthur J. Plantamura

[57]  ABSTRACT

A topsoil composition comprising an alumina clay, an organic compost and sand effective to nurture and sustain plants. The proportions of the ingredients are chosen to provide good nutrients to plants, good water retention and good water drainage properties, and generally comprise at least 20 percent by volume of each ingredient, and typically comprises about 25 percent by volume of alumina clay, up to 30 percent by volume of compost and about 45 percent by volume of sand.

5 Claims, No Drawings

SYNTHETIC TOPSOIL COMPOSITION

This invention relates to a composition for growing and maintaining plant life. More particularly, this invention relates to a composition useful as a synthetic topsoil composition that has good organic content and good moisture retention and drainage properties.

BACKGROUND OF THE DISCLOSURE

Maintaining the external appearance of grounds is a high priority for both residential and commercial buildings. Grass and plantings require good soil that will retain moisture but that will also drain well and will not compact unduly, and that can provide nutrients for long plant life. However, in many parts of the country, good topsoil is unavailable and it is expensive to ship.

Landscaping, both for residential and commercial buildings, is generally installed by transplanting nursery stock into prepared beds. Irrigation systems can also be installed to ensure healthy plants. Nevertheless, if rainfall is less than normal, particularly in sandy soils that do not have good water retention properties, the plants can decline and die. On the other hand, during heavy rains, the soil must have good drainage or the water stays on top and the roots can rot. If the commercial grower or landscaper has guaranteed the plants, he must replace them at his own expense.

Thus a synthetic topsoil that is comparatively inexpensive, that has a high organic content, good water retention and water drainage properties, and that can be manufactured locally, would be highly desirable.

SUMMARY OF THE INVENTION

I have discovered a mixture of materials that makes a good topsoil composition comprising an alumina clay, an organic compost material, and sand. The latter two ingredients can be derived locally, thereby avoiding high transportation costs. These ingredients are mixed in proportions so as to provide adequate organic content for good plant nutrition, good moisture retention and good moisture drainage properties.

In general the proportions of ingredients useful herein are on the order of at least about 15 percent by volume of alumina clay, at least about 20 percent by volume of organic compost and at least about 30 percent by volume of sand. Preferably the present topsoil compositions comprise about 20–30 percent by volume of alumina clay, about 20–40 percent by volume of compost and about 40–60 percent by volume of sand.

DETAILED DESCRIPTION OF THE INVENTION

The alumina clay material useful herein is a kaolin-type clay product produced as a co-product in the manufacture of aluminum sulfate from bauxite. The alumina clay is a material that is available commercially under the brand name HiClay from the General Chemical Corporation. It is a mixture primarily of alumina, silica and titanium dioxide; other oxides, including calcium oxide and ferric oxide, are present in minor amounts. The chemical nature and proportions of oxides of these clay materials vary somewhat depending on the bauxite raw material used to make it. As illustrations, typical alumina clay compositions made in Pennsylvania, Ohio and Florida are given in Table I below in percent by weight.

TABLE I

| SITE | PA | OH* | OH** | OH*** | FL* | FL** |
|---|---|---|---|---|---|---|
| $Al_2O_3$ | 43.04 | 33.21 | 33.66 | 57.26 | 24.51 | 25.66 |
| $SiO_2$ | 37.16 | 45.74 | 38.88 | 27.25 | 45.26 | 34.89 |
| $TiO_2$ | 16.66 | 9.99 | 20.83 | 16.10 | 13.98 | 14.68 |
| $Fe_2O_3$ | 2.78 | 4.57 | 2.30 | 2.61 | 0.66 | 0.05 |
| CaO | 5.39 | 6.55 | 3.94 | 3.91 | 4.69 | 7.38 |
| Other | 1.03 | 2.43 | 0.39 | 0.23 | 1.71 | 6.36 |

*(OH) Chilicothe
**(OH) Cleveland
***(OH) Middletown
(*FL) Jacksonville
**(FL) Tampa Other alumina clays are made in various places throughout the United States and Canada.

These alumina clays have a particle size distribution of >95% less than 350 microns; >50% less than 50 microns; >40% less than 2 microns.

The alumina clay materials described herein are stable and have a pH of about 3.5. The clay materials can be used directly as derived from manufacturing, particularly when a high pH compost material is used, or they can be neutralized with lime to the desired pH of the topsoil mixture. These alumina clays act as a binder for the sand and compost materials in the topsoil formulations. Thus the alumina clay acts to prevent separation of the compost and the sand, and also substantially improves resistance to soil erosion of the topsoils. The alumina clay also imparts good water retention to the topsoil composition because it can form hydrates to store water in the topsoil composition. The storage of water feature is an important advantage in soil enhancement. Typically these clays have a moisture retention percentage ranging from 115 percent up to 160 percent.

Compost is a name given to various materials having a high organic content. Suitable composts can be made from natural materials such as wood chips, leaves, grass clippings and other natural or yard waste materials. Such garden and yard waste materials are increasingly gathered by local community disposal facilities which grind up larger materials, such as tree limbs, to make wood chips. These can be mixed with leaves, grass clippings and plant materials, which are also collected. The present invention is an excellent way to recycle these materials locally.

Compost provides the major source of plant nutrients in the present synthetic topsoils. Compost also has good moisture retention, generally in the range of 115–140 percent. Natural compost also provides some measure of plant disease suppression. In addition, organic materials provide improved soil aeration which tends to promote heavier root growth and improved nutrient retention. This in turn reduces the amounts of nutrients that leach out of the soil, and reduces the amounts of synthetic fertilizers required to maintain the plants. The compost material also reduces soil compaction and erosion characteristics. However, since compost materials may vary widely depending on the season of the year and the type of materials used to make them, some control over the nature of the compost may be beneficial. Since the organic matter in the compost will degrade over time, thus shrinking the topsoil volume, preferably a maximum of about 30 percent by volume of compost in the present topsoil compositions is recommended.

The above materials are mixed with general purpose sand, which provides good drainage for water in the topsoil composition and prevents compaction of the other components.

The sand employed can be any locally available sand. The sand provides good drainage of free water from the soil, and prevents undue compaction of the clay and compost components. however, sand does not have good moisture retention properties, seldom more than about 30 percent.

The three component materials, when thoroughly mixed, provide a synthetic topsoil of the invention. Preferably the clay and sand materials are mixed together first, and the organic compost material blended into the mixture.

The topsoil compositions of the invention have the following general properties:

| | |
|---|---|
| pH | 6.5–7.5 |
| density | 0.95 gms/ml |
| bulk density (av) | 59.4 lbs/cu ft |
| soluble salts | 550–580 mg/l |

Although the present topsoil compositions have been described in terms of specific embodiments, the alumina clay is made in, and can be obtained from, many additional locations; and any of these alumina clays can be substituted for those described in Table I. The organic compost also varies in composition and properties depending on the types of materials used to make it. If needed, the general proportions of the topsoil components of the invention can be varied taking into account the pH, the amount of organic material and the composition of the clay. It is thus apparent that the proportions and conditions may vary and the present invention is only intended to be limited by the scope of the appended claims.

I claim:

1. A topsoil composition comprising at least about 15 percent by volume of an alumina clay at least about 20 percent by volume of an organic compost, and at least about 30 percent by volume of sand in proportions to provide adequate organic content for good plant nutrition, moisture retention and moisture drainage properties.

2. A topsoil composition according to claim 1 wherein the composition comprises about 20 to about 30 percent by volume of alumina clay, about 30 to about 40 percent by volume of organic compost and about 40 to about 60 percent by volume of sand.

3. A topsoil composition according to claim 1 wherein the composition comprises about 25 percent by volume of alumina clay, about 30 percent by volume of organic compost and about 45 percent by volume of sand.

4. A topsoil composition according to claim 1 wherein the alumina clay comprises primarily alumina, silica and titanium dioxide.

5. A topsoil composition according to claim 1 wherein the composition has a pH in the range of 6.5 to 7.5; a density of about 0.95 grams per milliliter, a bulk density of about 59.4 pounds per cubic foot, and a soluble salts content of 550–580 milligrams per liter.

* * * * *